United States Patent [19]
Demetrick

[11] 3,908,683
[45] Sept. 30, 1975

[54] TRANSLATING MULTI-RING INLET FOR GAS TURBINE ENGINES

[75] Inventor: Roy W. Demetrick, Kent, Wash.

[73] Assignee: The Boeing Company, Seattle, Wash.

[22] Filed: June 3, 1974

[21] Appl. No.: 475,534

[52] U.S. Cl. .................... 137//15.1; 138/46
[51] Int. Cl.² .......................... F02K 3/00
[58] Field of Search ........... 137/15.1, 15.2; 138/45, 138/46

[56] References Cited
UNITED STATES PATENTS

| | | | |
|---|---|---|---|
| 1,027,825 | 5/1912 | Doble | 137/601 X |
| 3,583,417 | 6/1971 | Clark | 137/15.1 |

FOREIGN PATENTS OR APPLICATIONS

| | | | |
|---|---|---|---|
| 792,831 | 4/1958 | United Kingdom | 137/15.1 |

Primary Examiner—Alan Cohan
Attorney, Agent, or Firm—Morris A. Case; Glenn Orlob; Bernard A. Donahue

[57] ABSTRACT

A variable geometry engine inlet with translating concentric rings. One set of rings extend across the inlet opening and a second set of rings are movable into and out of interjacent position with the first set of rings. Also disclosed is a single set of concentric rings that may translate between the throat and the diffuser area of the inlet.

14 Claims, 9 Drawing Figures

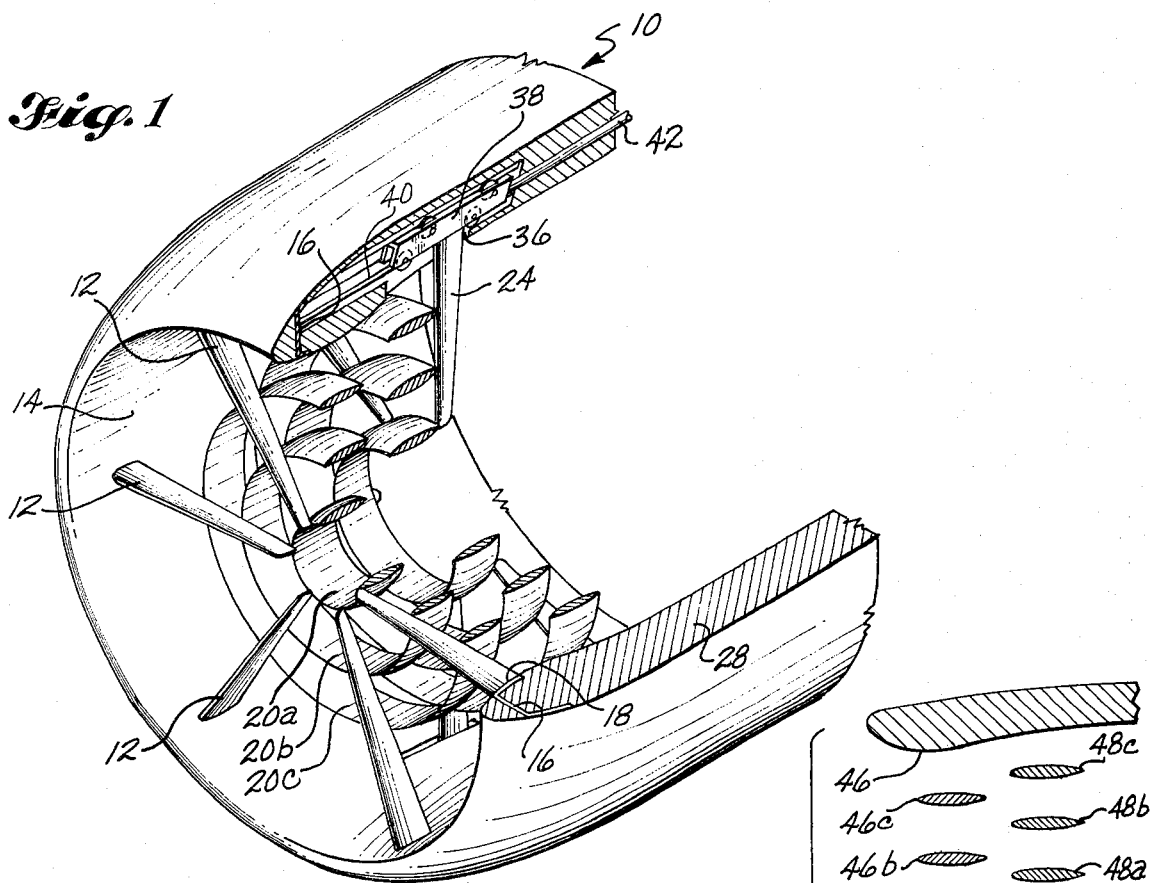
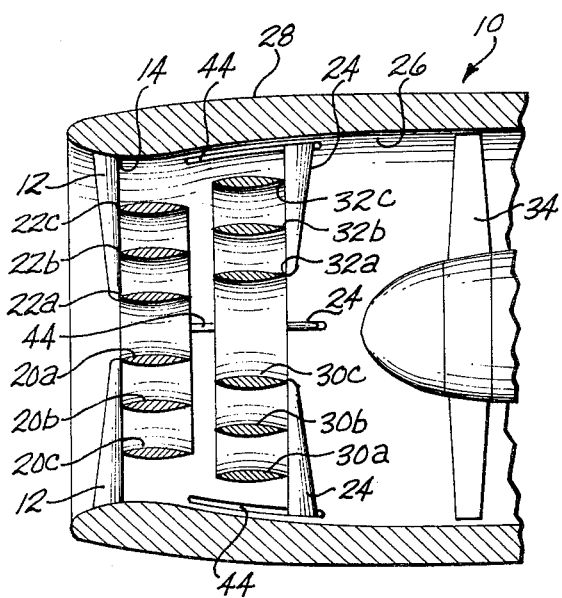
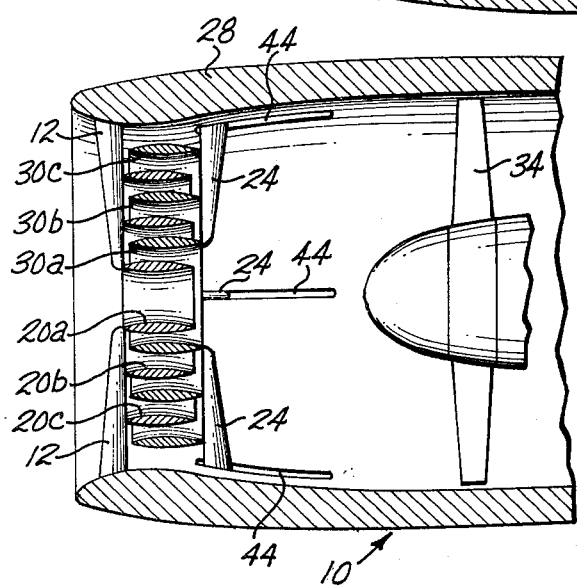
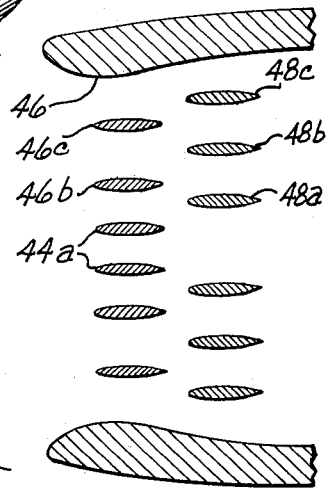

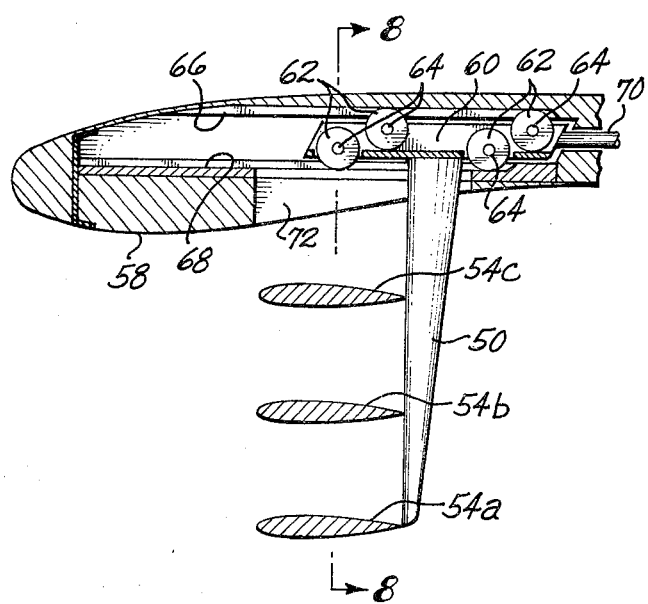
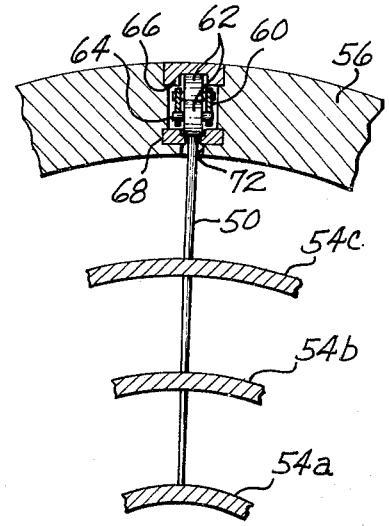
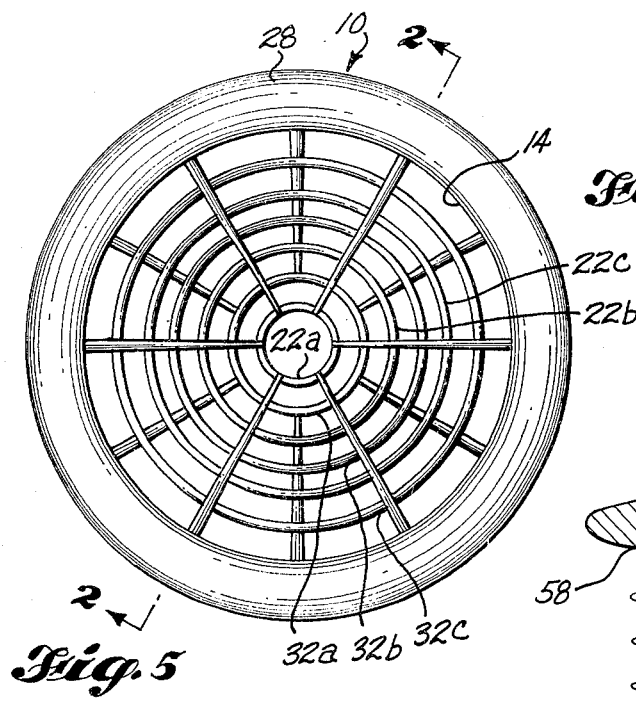
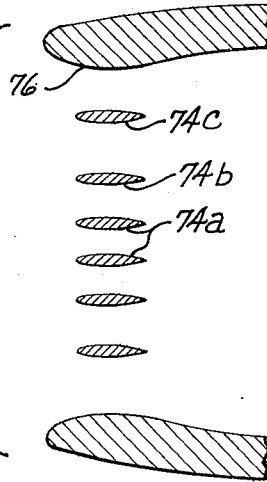
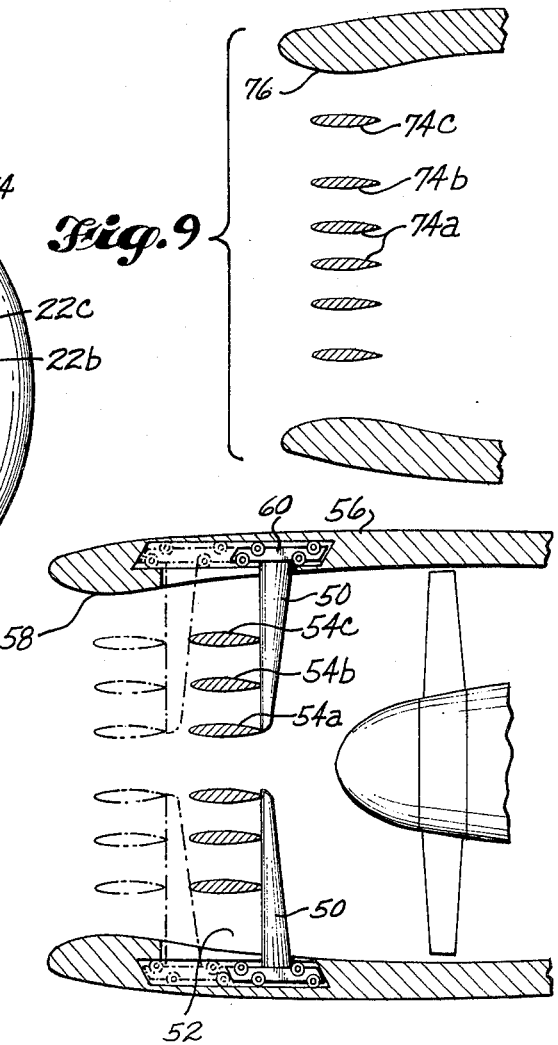

3,908,683

TRANSLATING MULTI-RING INLET FOR GAS TURBINE ENGINES

BACKGROUND OF THE INVENTION

Noise radiating from jet engine inlets will be greatly reduced if the inlet airflow can be made to travel at, or near, the speed of sound. Special methods and equipment are required to accomplish this without causing excessive flow losses and seriously effecting engine thrust output. Turbine engines are designed for a specific relative velocity and angle of attack on the blades. If the air or gas velocity relative to the blades gets too high the engine efficiency begins to drop off. Thus, in subsonic flight the velocity through the inlet should enter at or near sonic, but be diffused down to about Mach. 5 before it reaches the blades. A considerable area reduction of the inlet throat is required during approach mode in order to maintain near sonic inlet velocities due to lowered engine setting while in the approach; so variable inlets are required. It is known to use an expanding or translating centerbody, but an expanding centerbody often has seal problems and a translating centerbody requires excessive length of diffuser inlet area. In U.S. Pat. No. 3,583,417 by Clark, there were disclosed two or more sets of parallel vanes extending transversely across the engine inlet, with said sets capable of being translated axially with respect to each other to be interjacent; or to be separated from each other to vary the area of the inlet. These parallel vanes work well, but do have circumferential distortion, corner flow losses, and seal problems. British Pat. No. 792,831 uses sets of translating radially extending vanes, or alternately may use transversely extending parallel sets of translating vanes. In U.S. Pat. No. 2,968,147 by Truly, et al, it disclosed stationary circular strips or rings as a grid of flow dividers acting as a shock-positioning screen. This grid is located downstream from the throat of a supersonic ramjet engine to prevent rearward movement of the shock system.

SUMMARY OF THE INVENTION

A set of concentric rings are located across the inlet to a gas turbine engine. This set of rings is supported on the upstream side with radially extending struts. A second set of concentric rings are located in the inlet to translate axially into and out of interjacent position with the first set of rings. This translating set of rings is supported on the downstream side with radially extending struts which permit the two sets of rings to intermesh. Alternately a single set of concentric rings are mounted to radially extending struts which in turn are movably mounted to axially translate the concentric rings between the throat and the diffusion area of the inlet.

An object of this invention is to provide gas turbine air inlet control of inlet sound emission and of inlet airflow for turbine efficiency at different engine speeds with a variable geometry inlet.

Another object of this invention is to provide increased air velocity across the throat of an aircraft gas turbine engine during the approach and the take-off mode of an aircraft.

DESCRIPTION OF THE DRAWINGS

FIG. 1 shows a fragmented perspective view, partially in section, of an engine inlet with a double set of concentric rings.

FIG. 2 shows a side elevational sectional view taken along line 2—2 of FIG. 5.

FIG. 3 shows a side elevational sectional view as in FIG. 2 with the inlet in full choke position.

FIG. 4 shows a side elevational schematic of a sectional view of an alternate arrangement of the sets of concentric rings of FIG. 1.

FIG. 5 shows an end view looking into the inlet of FIG. 1.

FIG. 6 shows a side elevational schematic of a sectional view of a different embodiment with a single set of concentric rings.

FIG. 7 shows a blown up view of part of FIG. 6.

FIG. 8 shows a fragmented section taken along line 8—8 of FIG. 7.

FIG. 9 shows a side elevational schematic of a sectional view of an alternate arrangement of the concentric rings of FIG. 6.

DETAILED DESCRIPTION

FIG. 1 shows a variable geometry inlet 10 to control the flow of air. Struts 12 extend radially across the throat or opening 14 into the inlet. These struts are rigidly connected to structural member 16 by any conventional means. One such means might be by welding the strut at its peripheral end 18 to the structural member. A set of 20 of concentric rings is shown separately as 20a, 20b, and 20c. Three rings are shown here, but the number may vary with inlet requirements. These rings or vanes may be of airfoil cross section throughout the annular extent. The ring circumferential shape would be determined by and would reflect the shape of the walls of the inlet. The rings 20 are attached, best shown in FIG. 2, to the back of the struts or, in other words, the upstream side of the vanes or rings in relation to airflow. The attachment may be by any convenient means, but in this view the rings are welded to the struts at local fairing points 22a, 22b and 22c. A second set of struts 24 extend radially across the diffuser area 26 of the inlet cowling 28. In the diffuser area the cross sectional area of the inlet increases in a downstream direction from the throat. A second set of concentric rings 30 are shown separately as 30a, 30b and 30c. These rings are rigidly attached at local fairing points 32a, 32b and 32c, respectively, to the upstream side of the second set of struts 24. The concentric rings in each set are positioned and spaced to interdigitate when the second set of rings are translated axially forward into interjacent position, as shown in FIG. 3. The minimum throat area is achieved when the rings are all aligned in the same axial plane. The concentric ring arrangement produces very little circumferential flow distortion which will minimize fatigue stress problems in the fan blade 34 and also minimize the generation of discrete tones by the fan. The peripheral ends 36 of the second set of struts are fastened to a carriage 38; which rides in track 40 located in the cowling 28. The carriage is translated by any conventional means, mechanical, electrical or pneumatic or hydraulic. In FIG. 1 a piston rod 42 from a hydraulic actuated cylinder is shown, but the hydraulic actuation system to move the rod is conventional and is not shown. All carriages will be moved as a unit. Longitudinal slots and seals 44 through the skin of the diffuser area 26 allow movement of the struts.

During take-off or approach of an airplane, the engine power setting and air flow is quite different than it is at cruise. Approach power settings in particular are much lower than at cruise, yet it is essential the emitted noise be lowest at this time because of the proximity of populated communities. The variable geometry inlet of this invention effects a considerable area variation of the inlet throat. In operation and at airplane cruise conditions the set of movable concentric rings 30 would be moved away from the set of stationary concentric rings 20 to present maximum area for air flow. In an approach mode as the engine power is reduced the movable struts with rings are translated into interjacent position with the stationary rings to maintain near Mach 1 air velocity through the inlet throat to keep inlet noise emission at a minimum.

The rings are shaped to present minimum resistance to air flow. Thus, the rings are preferably aerodynamically or airfoil shaped.

In another embodiment shown in FIG. 4, the distance between stationary rings 44a and 44b is less than the distance between 44b and 44c and preferably the distance from the outermost ring 44c and the inside of the throat 46 is greater than the distance between the furtherest apart rings. The movable set of rings 48a and 48b are positioned to interdigitate with the stationary rings to maintain an increase in distance between rings from the axis outward even when the rings are interjacent. Thus, the distance between rings in a set increase and the distance between interjacent rings increased from the axis outward. This embodiment permits control over the radial gradient in Mach number across the inlet opening while maintaining axisymmetric flow. In particular, this may be used to reduce the common problem of excessive Mach number in the outer radial positions of an inlet throat. The number of rings and gap distance may be varied to obtain a more nearly constant flow velocity throughout the radial extent of an inlet to benefit noise control and to improve engine performance.

In FIG. 6 is shown yet another embodiment with movable strut 50 extending radially across diffusion area 52. Rings 54a, 54b and 54c make up a set 54 of concentric rings that are joined to the struts. The cross sectional area of the inlet cowling 56 increases from the throat opening 58 through the diffuser area. The movable rings translate axially to a position athwart the throat. The peripheral ends of the struts are attached to a carriage 60; which is best shown in FIGS. 7 and 8. A set of four wheels 62, each of which is rotatably pinned at 64 to the carriage to provide for movement over a track made up of upper part 66 and lower part 68. The carriage is connected to a hydraulic piston rod 70 which drives the carriage through a synchronized hydraulic actuating system not shown. The strut extends through a slot 72 which permits movement of the movable carriage with rings.

In operation the movable struts are positioned across the diffuser area of the inlet during cruise, and are translated forward to a position athwart the throat when the airplane is in the approach mode. The concentric circular or annular rings may be spaced equidistance from each other or may be spaced as in FIG. 9 where the distance between rings 74a and 74b is less than between 74b and 74c, and the distance between the ring 74c and the inside wall 76 of the inlet throat is greater than the distance between rings 74b and 74c. This variable distance between concentric rings with an increase in distance from the axis outward contributes to the control of radial gradient in Mach number.

I claim:
1. An inlet for gas turbine engine with air flow through the inlet controlled by a variable geometry apparatus comprising: a first set of concentric rings positioned across an opening to the inlet, a second set of concentric rings located to translate axially into and out of interjacent position with the first set of concentric rings to present a reduced area for air flow when in interjacent position and to present an enlarged area for air flow when moved out of the interjacent position, means for translating the second set of concentric rings, and the distance between concentric rings in each set increase with the distance from the axis.

2. An inlet for a gas turbine engine as in claim 1, wherein the outermost ring is spaced at a greater distance from the inner wall of the inlet than the distance between the rings.

3. An inlet for a gas turbine engine with air flow through the inlet controlled by a variable geometry apparatus comprising: a first set of concentric rings positioned across an opening to the inlet, a second set of concentric rings located to translate axially into and out of interjacent position with the first set of concentric rings to present a reduced area for air flow when in interjacent position and to present an enlarged area for air flow when moved out of the interjacent position, means for translating the second set of concentric rings, the first set of concentric rings is supported at the leading streamwise edges by radially extending struts, and the second set of concentric rings is supported at the trailing streamwise edges by radially extending struts.

4. An inlet for a gas turbine engine as in claim 3, wherein a peripheral end of each strut supporting the second set of concentric rings is mounted to a movable carriage.

5. An inlet for a gas turbine engine as in claim 4, wherein the sets of concentric rings are shaped aerodynamically.

6. An inlet for a gas turbine engine as in claim 4, wherein the distance between concentric rings in a set increases from the axis outward, and the distance between the outward ring and an innter inlet wall is greater than the distance between the furtherest apart rings.

7. An inlet for a gas turbine engine with air flow through the inlet controlled by a variable geometry apparatus comprising: a first set of struts extending radially across an inlet throat; a first set of concentric rings mounted to a downstream side of the first set of struts; a second set of struts extending radially across the inlet movably mounted for reciprocal axial movement; a second set of concentric rings mounted to an upstream side of the second set of struts, said concentric rings located to move into interjacent position with the first set of concentric rings when the second set of struts translate upstream and out of interjacent position when said struts translate downstream, and means for imparting movement to the second set of struts with concentric rings.

8. An inlet for a gas turbine engine as in claim 7, wherein the concentric rings are aerodynamically shaped.

9. An inlet for a gas turbine engine as in claim 7, wherein the means for imparting movement to the second set of struts include a carriage attached to a peripheral end of each strut for movement along a track mounted inside the structure of the inlet.

10. An inlet for a gas turbine engine as in claim 9, wherein the distance between the concentric rings in each set increase from the axis outward and the distance between the outermost ring and the inner wall of the inlet is greater than the distance between the furtherest apart rings.

11. An inlet for a gas turbine engine with air flow through the inlet controlled by a variable geometry apparatus comprising: an inlet throat, a diffuser area extending downstream from the throat and having an increasing inside cross sectional area, a set of concentric rings extending across the inlet, and means for translating the set of concentric rings between a piston athwart the throat and a position athwart the diffuser area to vary the area for air flow.

12. An inlet for a gas turbine engine as in claim 11, wherein the distance between concentric rings increase from an axis outward, 13. An inlet for a gas turbine engine as in claim 11, wherein the means for translating the concentric rings include a set of radially extending struts to which the rings are mounted, a carriage movable in a track located in the inlet structure, said carriage supporting the peripheral ends of the struts.

14. An inlet for a gas turbine engine as in claim 13, wherein the distance between concentric rings increase from an axis outward.

* * * * *